(12) United States Patent
Mutlaq

(10) Patent No.: US 10,054,923 B1
(45) Date of Patent: Aug. 21, 2018

(54) UNIVERSAL ASTRONOMICAL INSTRUMENTATION CONTROL SYSTEM

(71) Applicant: Jasem K. M. Mutlaq, Safat (KW)

(72) Inventor: Jasem K. M. Mutlaq, Safat (KW)

(*) Notice: Subject to any disclaimer, the term of this patent is extended or adjusted under 35 U.S.C. 154(b) by 0 days.

(21) Appl. No.: 15/900,675

(22) Filed: Feb. 20, 2018

Related U.S. Application Data

(60) Provisional application No. 62/461,736, filed on Feb. 21, 2017.

(51) Int. Cl.
G05B 9/02 (2006.01)
G05B 19/042 (2006.01)
H04L 29/06 (2006.01)

(52) U.S. Cl.
CPC .......... *G05B 19/0425* (2013.01); *G05B 2219/21156* (2013.01); *G05B 2219/23298* (2013.01); *G05B 2219/25112* (2013.01); *H04L 67/42* (2013.01)

(58) Field of Classification Search
CPC .......... G05B 19/40; G05B 2219/42211; G05B 2219/45179; G05B 19/0425
USPC .................................................. 700/299, 79
See application file for complete search history.

(56) References Cited

U.S. PATENT DOCUMENTS

| 4,764,881 A | 8/1988 | Gagnon | |
|---|---|---|---|
| 7,221,527 B2* | 5/2007 | Baun | G02B 23/00 359/399 |
| 7,769,475 B2* | 8/2010 | Fujimoto | G01S 5/16 359/399 |
| 7,945,858 B1* | 5/2011 | Bisque | G02B 23/00 700/245 |
| 8,688,833 B1 | 4/2014 | Nishimoto | |
| 2001/0033416 A1 | 10/2001 | Baun et al. | |

(Continued)

FOREIGN PATENT DOCUMENTS

| CN | 203117687 | * | 8/2013 | .......... G05B 19/042 |
|---|---|---|---|---|
| CN | 203178568 U | | 9/2013 | |
| CN | 204631483 U | | 9/2015 | |

(Continued)

OTHER PUBLICATIONS

"Ekos Complete Astrophotography Tutorial", www.youtube.com/watch?v=wNpj9mNc0RE, 3 sheets (2014).

(Continued)

*Primary Examiner* — Chun Cao
(74) *Attorney, Agent, or Firm* — Richard C. Litman

(57) ABSTRACT

The universal astronomical instrumentation control system is completely based on an Open Source architecture in the server- and client-side components. The system is self-contained within a single small factor package using embedded hardware architecture. No desktop or server-side components are required. The system creates a WiFi hotspot that enables mobile/tablet/desktop devices to connect to it and control any astronomical devices attached to the unit. Therefore, no external network is required in order to operate the device. The system is not limited to canonical devices. Any device with an INDI (Instrument Neutral Distributed Interface) driver can be controlled by the unit. The system's client software is cross-platform and available on desktop, tablet, and mobile devices. The system is a consumer-level device designed for fast and easy control of commercially popular astronomical equipment.

1 Claim, 17 Drawing Sheets

(56) References Cited

U.S. PATENT DOCUMENTS

2008/0046121 A1\* 2/2008 Pao ........................ B25J 9/1617
 700/245
2016/0337574 A1\* 11/2016 Chen .................. H04N 5/23212

FOREIGN PATENT DOCUMENTS

| CN | 204631583 U | 9/2015 | | |
|---|---|---|---|---|
| CN | 105446152 | 3/2016 | | |
| CN | 205232324 U | 5/2016 | | |
| DE | 19916138 A1 | 10/2000 | | |
| KR | 20050114962 | \* 12/2005 | ............... | H04B 1/40 |

OTHER PUBLICATIONS

"SkyFi: Wireless WiFi Telescope Control", www.simulationcurriculum.com/products-telescope-accessories.html, 3 sheets (2016).

\* cited by examiner

INDI with an intermediate Server

UNIVERSAL ASTRONOMICAL INSTRUMENTATION CONTROL SYSTEM

CROSS-REFERENCE TO RELATED APPLICATION

This application claims the benefit of U.S. Provisional Patent Application Ser. No. 62/461,736, filed Feb. 21, 2017.

BACKGROUND OF THE INVENTION

1. Field of the Invention

The present invention relates to electronic systems with resources directed towards matters relating to astronomy, and particularly to a universal astronomical instrumentation control system that can connect to and control any astronomical device attached directly or over the network.

2. Description of the Related Art

The prior art is replete with automation systems specific to particular telescopes and/or observatories, often locked to a specific hardware architecture and/or operating systems. Yet, an optimized hardware unit that is designed from the ground-up to support astronomical instrumentation is desired. With the introduction of Raspberry PI in 2012, single board computers (SBCs) became powerful enough to run GNU/Linux Operating Systems. What is needed, however, is an SBC-based generic control system optimized for commercially available astronomical devices with the capability to support any future device.

Thus, a universal astronomical instrumentation control system solving the aforementioned problems is desired.

SUMMARY OF THE INVENTION

The universal astronomical instrumentation control system is completely based on an Open Source architecture in the server- and client-side components. The system is self-contained within a single small factor package using embedded hardware architecture. No desktop or server-side components are required. The system creates a dynamic WiFi hotspot that enables mobile/tablet/desktop devices to connect to it and control any astronomical devices attached to the unit. Therefore, no external network is required in order to operate the device. The unit can be operated standalone or as part of a mesh of networked devices in ad hoc configuration. The system is not limited to canonical devices. Any device with an INDI (Instrument Neutral Distributed Interface) driver can be controlled by the unit. The system's client software is cross-platform and available on desktop (Windows, Mac OS, Linux), tablet, and mobile devices. The system is a consumer-level device designed for fast and easy control of commercially popular astronomical equipment.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
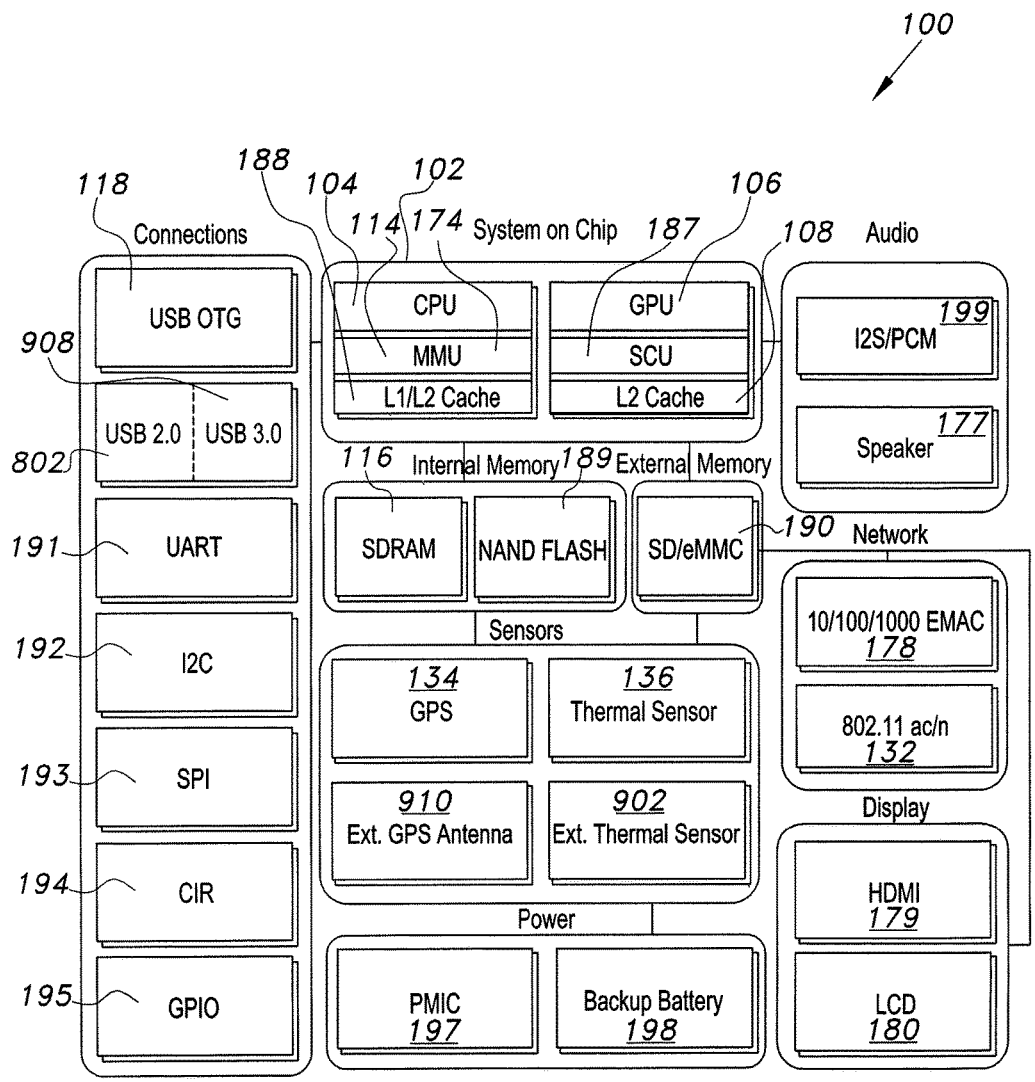
FIG. 1 is a block diagram of a universal astronomical instrumentation control system according to the present invention.

At the outset, it should be understood by one of ordinary skill in the art that embodiments of the present universal astronomical instrumentation control system can comprise software or firmware code, e.g. compiled object code, executing on a computer, a microcontroller, a microprocessor, or a DSP processor; state machines implemented in application specific or programmable logic, or numerous other forms without departing from the spirit and scope of the control system described herein. The present universal astronomical instrumentation control system can be provided as a computer program, which includes a non-transitory machine-readable medium having stored thereon instructions that can be used to program a computer (or other electronic devices) to perform a process according to system requirements. The machine-readable medium can include, but is not limited to, floppy diskettes, optical disks, CD-ROMs, and magneto-optical disks, ROMs, RAMs, EPROMs, EEPROMs, magnetic or optical cards, flash memory, or other type of media or machine-readable medium suitable for storing electronic instructions.

The universal astronomical instrumentation control system includes a single board computer (SBC) within an environmentally protected enclosure and is based on completely open source architecture in the server- and client-side components. The system is self-contained within a single small factor package using embedded hardware architecture, wherein the system's software components are embedded in the hardware as field-upgradable firmware. No desktop or server-side components are required. The system creates a Wi-Fi hotspot that enables mobile/tablet/desktop devices to connect to it and control any astronomical devices attached to the unit. Therefore, no external network is required in order to operate the device.

The device is a self-contained unit for control of commercially available third-party devices. The system is not limited to canonical devices. Any device with an INDI driver can be controlled by the unit. The unit is an embedded device that can support operation of a GNU/Linux Operating System. The operating system is preloaded with open source server-/client-side software components designed to enable control and automation of astronomical instrumentation. The server-side software consists primarily of firmware utilizing open source software for open astronomical instrumentation control. The primary client-side software is installed within the unit and may be used directly using an external HDMI connector or via a remote desktop session using a VNC client. Furthermore, users may opt to remotely control the unit via a web interface or via third-party client software on mobile, tablet, and desktop form factors. The system's client software is cross-platform and available on desktop, tablet, and mobile devices. The system is a consumer-level apparatus intended for fast and easy control of commercially popular astronomical equipment.

The control unit is a single board computer (SBC) that contains a central processing unit (CPU), graphics processing unit (GPU), random access memory (RAM), Flash storage, Ethernet/Wi-Fi, global positioning system (GPS), Temperature/Humidity sensor, Universal Serial Bus (USB) 3.0/2.0 host, with auxiliary inputs/outputs for various devices. The universal astronomical instrumentation control system enables users to control astronomical instruments, such as mounts, cameras (CMOS and CCDs), adaptive optics units, focusers, filter wheels, domes, weather stations, and a plethora of observatory equipment in a simple and user-friendly manner. Multiple networking methods are available, including Ethernet, Wi-Fi, and Hotspot. Users can configure the devices directly from the universal astronomical instrumentation control system using an external monitor via high definition multimedia interface (HDMI) connection, or via a virtual network computing (VNC) connection to the unit, or via specialized client software tailored to operate the unit. For remote control operations, the unit offers an observatory safeguard tool where, upon loss of communications after a user-configurable period of time, the observatory goes into shutdown mode to protect the observatory assets from any potential damage. Furthermore, the safeguard tool enables the user to set environmental limits, including, but not limited to, temperature, humidity, a rain sensor (via external auxiliary device), a cloud sensor (via external auxiliary device), or a sky quality meter (via external auxiliary device). Upon exceeding the environmental limits, the user can configure the observatory to go either in soft shutdown mode until the environmental factors improve or in full shutdown mode until further notice. If the power to the unit is terminated, a backup battery continues to power the device until power is restored. Upon power termination, the unit can automatically initiate a safe and graceful shutdown of the observatory equipment without direct user intervention and can dispatch alerts via e-mail if a network is available. Additionally, the unit supports port mappings of attached USB-Serial devices. Since port mappings of serial devices is random within the OS upon connection or power-up, the unit provides a tool to uniquely identify each attached serial device and assign a permanent port mapping to it that is retained between restarts. This facilitates automation, since the user is not required to manually verify the port mappings of attached devices once the unit has been powered up.

Cross-platform clients for Windows, OSX, and Linux, in addition to mobile/tablet devices, enable seamless control of the user's equipment.

As shown in FIG. 1, the universal astronomical instrumentation control system 100 includes a system on a chip (SoC) 102, which comprises a combination L1/L2 cache 188 in operable communication with the CPU 104 via an MMU 114. An L2 cache 108 is in operable communication with a GPU 106 via a snoop control unit (SCU) 187. Internal memory comprising SDRAM 116 and negative-AND gate (NAND) FLASH 189 is operably connected to the SoC 102. External memory comprising Secure Digital embedded Multimedia storage card (SD/eMMC) 190 is also operably connected to the SoC 102. Sensors, including a GPS 134, a thermal sensor 136, an external GPS antenna connector 910, and an external thermal sensor connector 902 are operably connected to the SoC 102. The system power is controlled by a Power Management Multi-Channel IC (PMIC) 197, which also manages a backup battery 198. Audio cues for status including alerts and notifications of the system are provided by a 12S/PCM power module 199 operably connected to the SoC 102 and powering internal speaker 177. Network interfaces operably connected to the SoC 102 include a 10/100/1000 Ethernet Media Access Controller (EMAC) 178 and an 802.11 ac/n router 132. Display interfaces operably connected to the SoC 102 include an HDMI interface 179 and a Liquid Crystal Display (LCD) status screen interface 180. Astronomical & Auxiliary device connection interfaces are in operable communication with the SoC 102 and comprise a USB OTG 118, USB 2.0 802, USB 3.0 908, universal asynchronous receiver/transmitter (UART) 191, Inter-Integrated Circuit (I2C) protocol transceiver 192, Serial Peripheral Interface (SPI) 193, Consumer Infrared (CIR) interface 194, and General-purpose input/output (GPIO) interface 195.

The Single Board Computer 102 runs GNU/Linux OS. The operating system is preloaded with Ekos, the INDI Library server, scripting tools, core drivers, third-party drivers, an astrometric solver, and auxiliary web services to enable astronomical device control for INDI-supported devices. Optional additional client software control is achieved by cross-platform INDI clients on desktops and mobile/tablets.

Figure 2:
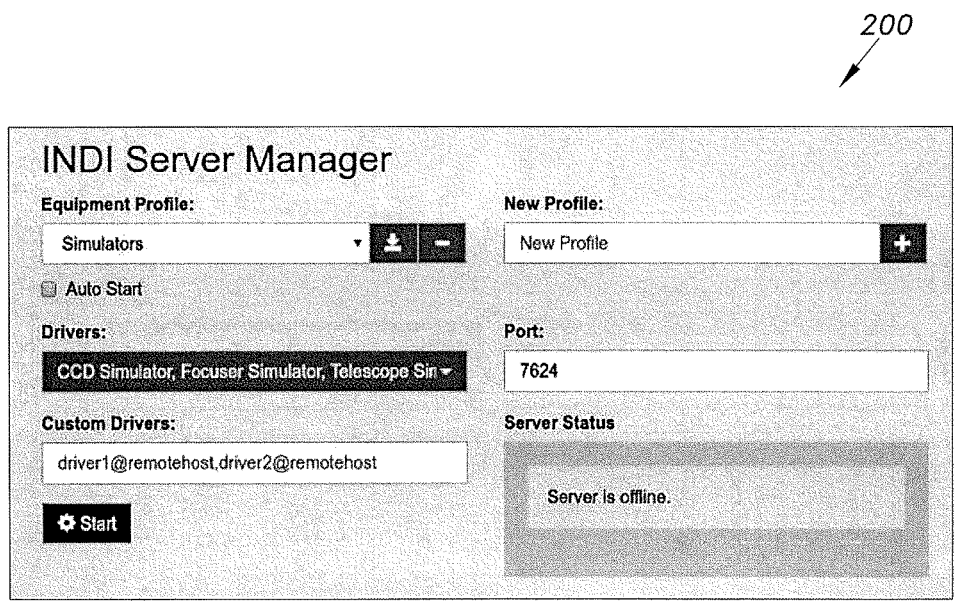
FIG. 2 is a screenshot of an INDI Server Manager of a universal astronomical instrumentation control system according to the present invention.

As shown in FIG. 2, the INDI Server Manager is accessed via an INDI Server Manager page 200 that features Equipment Profile selection, New Profile addition, Drivers selection, Port number selection, a Custom Drivers entry field, Server status notification, and a Start button.

Figure 3:
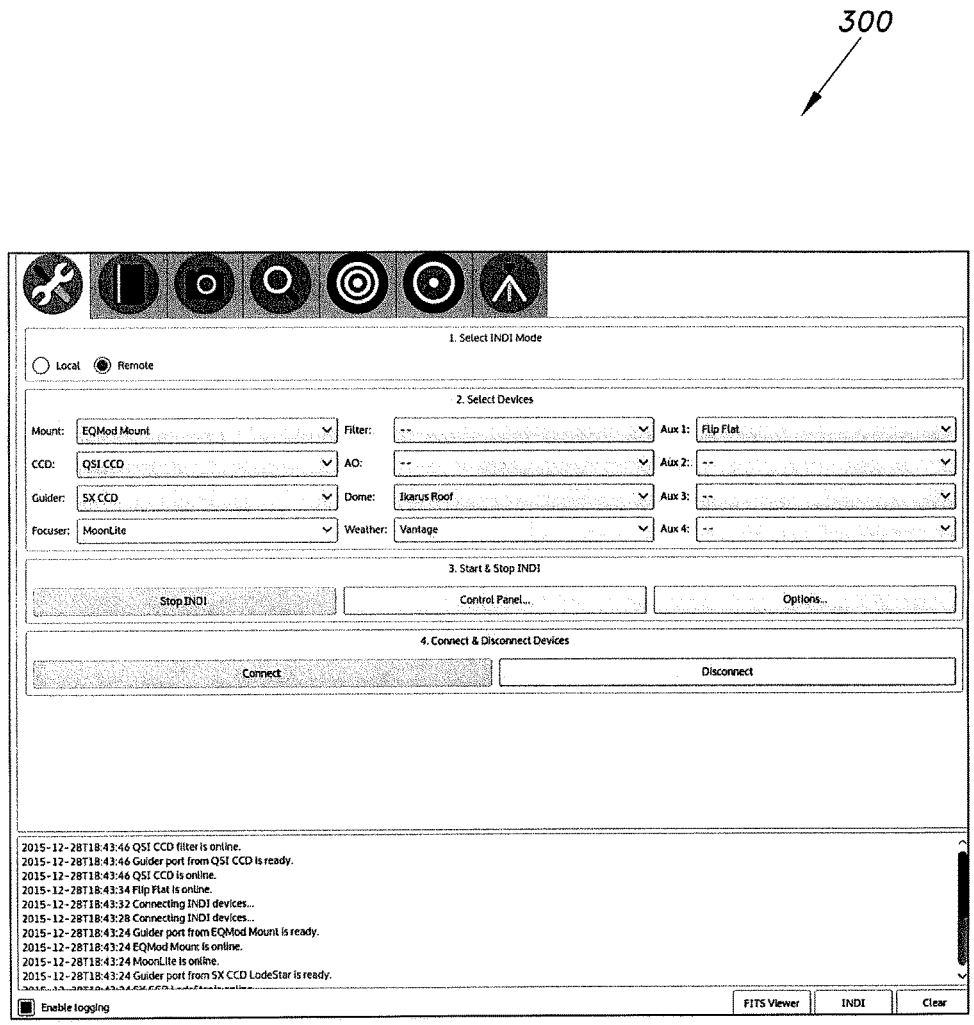
FIG. 3 is a screenshot of the embedded astrophotography software (Ekos) setup page of a universal astronomical instrumentation control system according to the present invention.

As shown in FIG. 3, the Ekos Setup page 300 provides device selection, which includes Mount selection, CCD selection, Guide selection and Focuser selection. Additional devices that can be selected from the Ekos Setup page 300 include Filter, AO, Dome, and Weather. Moreover, in the exemplary Setup page 300, four auxiliary devices may be selected.

Figure 4:
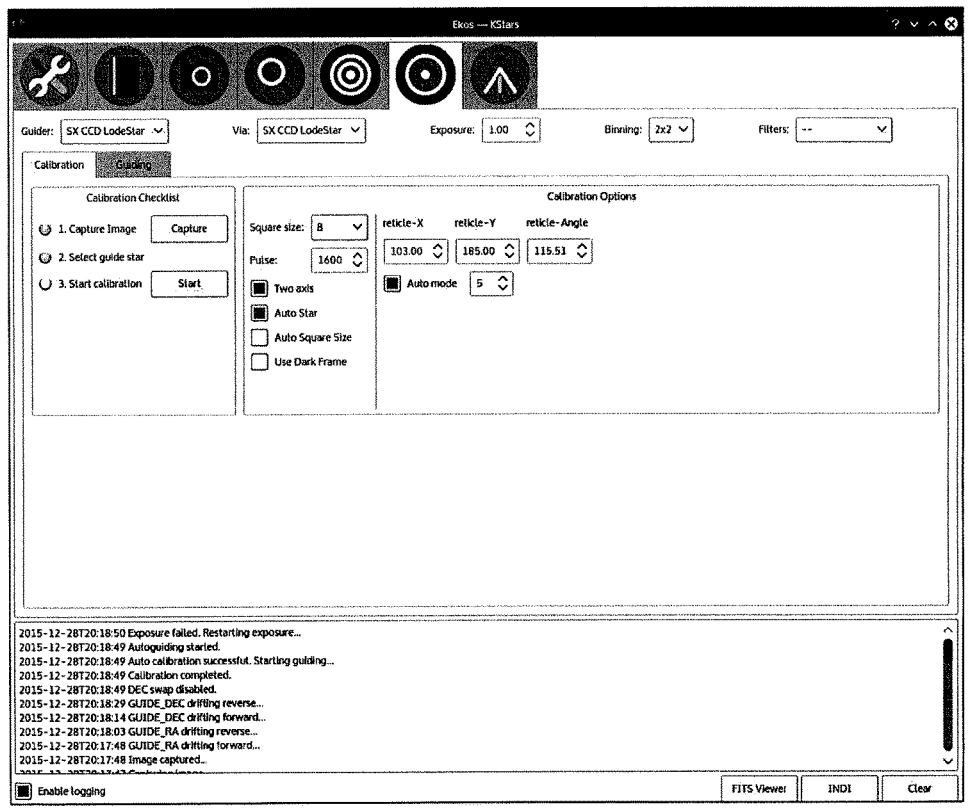
FIG. 4 is a screenshot of the Ekos guiding module of a universal astronomical instrumentation control system according to the present invention.

The Ekos Guiding Module page 400, shown in FIG. 4, provides Guider selection, Via equipment selection, Exposure selection, Binning selection, and Filters selection. Also included on the Ekos Setup page 300 are Guiding and Calibration buttons, a Calibration Checklist that includes Capture Image, Select guide star, and Start calibration selectors, with a Capture initiate button and a Start calibration button. Calibration Options selection includes reticle-X and reticle-Y numerical selection, as well as reticle-Angle numerical selection. Auto mode and corresponding numerical selection setting the number of iterations the calibration process performs in each axis is also included. An Enable logging and corresponding event logging area is provided on the bottom portion of page 400.

Figure 5:
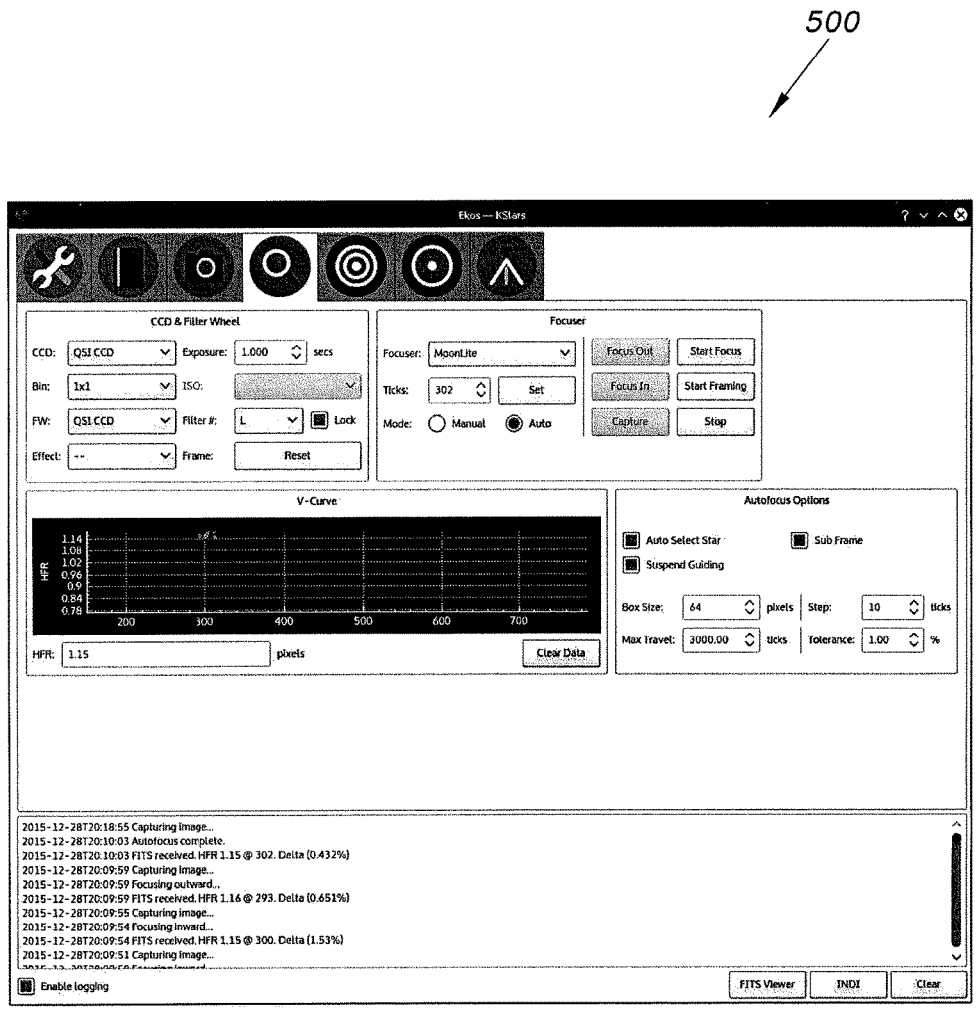
FIG. 5 is a screenshot of the Ekos focus module page of a universal astronomical instrumentation control system according to the present invention.

The Ekos Focus Module page 500, shown in FIG. 5, provides CCD and Filter Wheel parameter setting selectors, which include CCD, Bin, FW, Effect, Exposure, ISO, Filter number, and Frame selectors. A Focuser selection portion of page 500 includes Focuser, Ticks, Mode, Focus in, Focus out, and Capture selectors. An autofocus options portion of page 500 includes Auto Select Star, Suspend Guiding, Sub Frame, Box Size, Max Travel, Step and Tolerance selectors.

Figure 6:
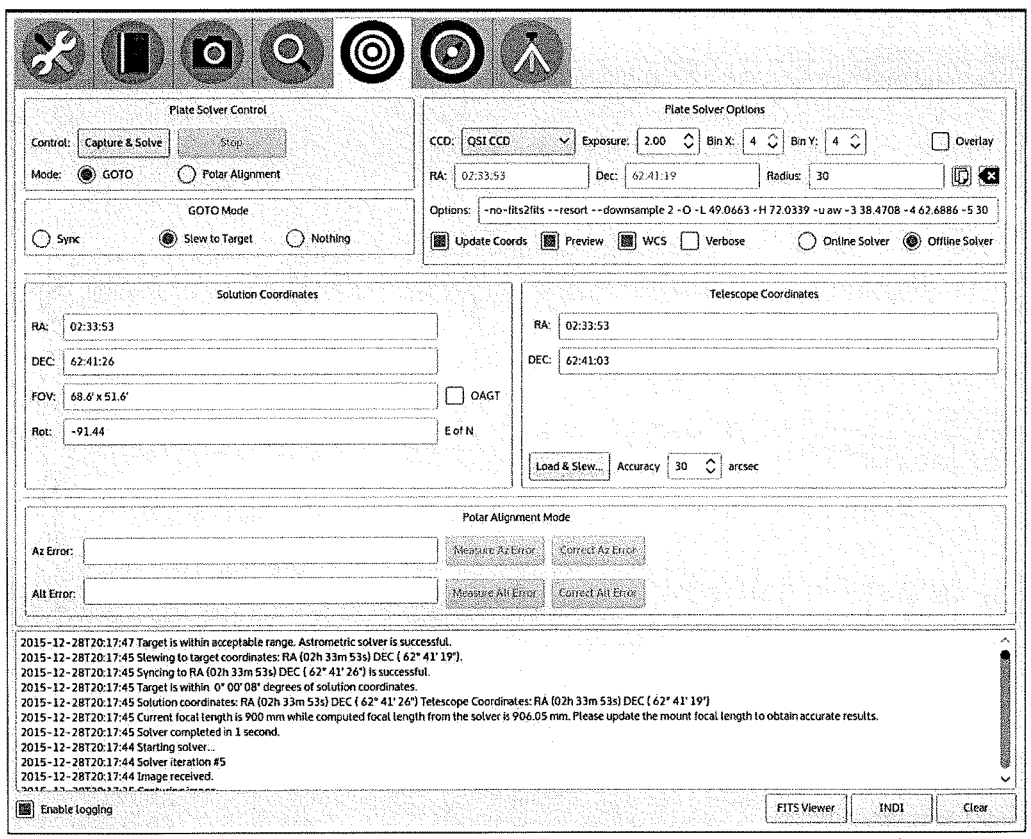
FIG. 6 is a screenshot of the Ekos Astrometry module of a universal astronomical instrumentation control system according to the present invention.

The Ekos Astrometry Module page 600, shown in FIG. 6, provides a Plate Solver Control portion that includes a Capture and Solve Control selector. The solver action portion of page 600 includes Sync, Slew to Target, and Nothing selectors. Right Ascension (RA): Declination (DEC): Field of View (FOV): and Rotation (Rot): solution coordinates with Load and Slew and Accuracy selectors are populated in a mid-portion of page 600. RA: and DEC: telescope coordinates are also populated in the mid-portion of page 600. Plate Solver options are displayed above the mid-portion of page 600, the options including CCD, Exposure, Bin-X, and Bin-Y, RA, Dec, Radius, Options entry field, Online Solver, Offline Solver, and Remote Solver selectors. The lower portion of page 600 includes azimuth (Az) error and altitude (Alt) error fields, and a Polar Alignment Tool that includes Measure Az error, Correct Az error, Measure Alt error, and Correct Alt error selectors.

Figure 7:
FIG. 7 is a screenshot of the Ekos options page of a universal astronomical instrumentation control system according to the present invention.

The Ekos Options Module page 700, shown in FIG. 7, provides General and Modules tabs. A Scheduler selection portion includes Lead Time, Pre-dawn, and Pre-emptive shutdown selectors. A Capture portion includes Temperature Threshold and Remember Job Progress selectors. A Guide portion includes Internal Guider/PHD2 selectors. PHD2 is an enhanced, second generation version of the popular "Push Here Dummy" (PHD) guiding software from Stark Labs that provides powerful, intelligent auto-guiding of telescopes for both PCs and Macs. A PHD2 entry field is provided. Host and Port entry fields are also provided. The lower portion of page 700 includes an Astrometry.net solver entry field, a config entry field, a wcsinfo entry field, an API key entry field, an API URL entry field, and a use JPG for upload selector. Help and Defaults selectors are disposed on the lower portion of page 700.

Figure 8:
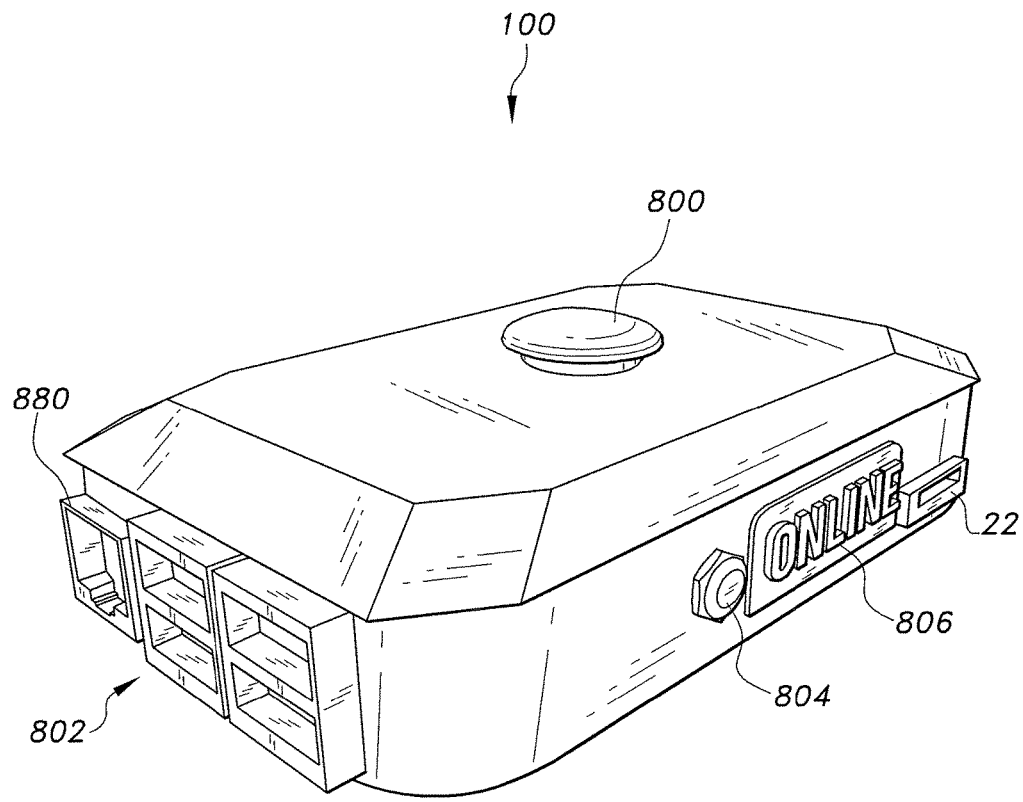
FIG. 8 is a perspective view of a universal astronomical instrumentation control system according to the present invention as viewed from the left rear.
Figure 9:
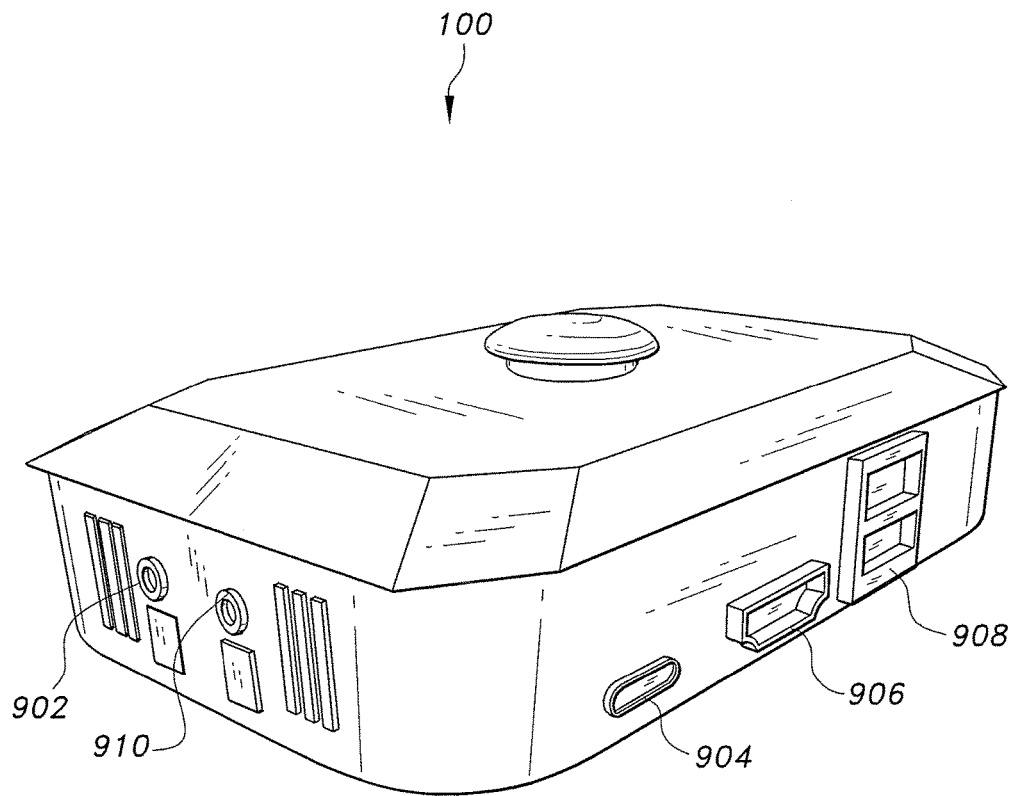
FIG. 9 is a perspective view of a universal astronomical instrumentation control system according to the present invention as viewed from the right front.
Figure 10:
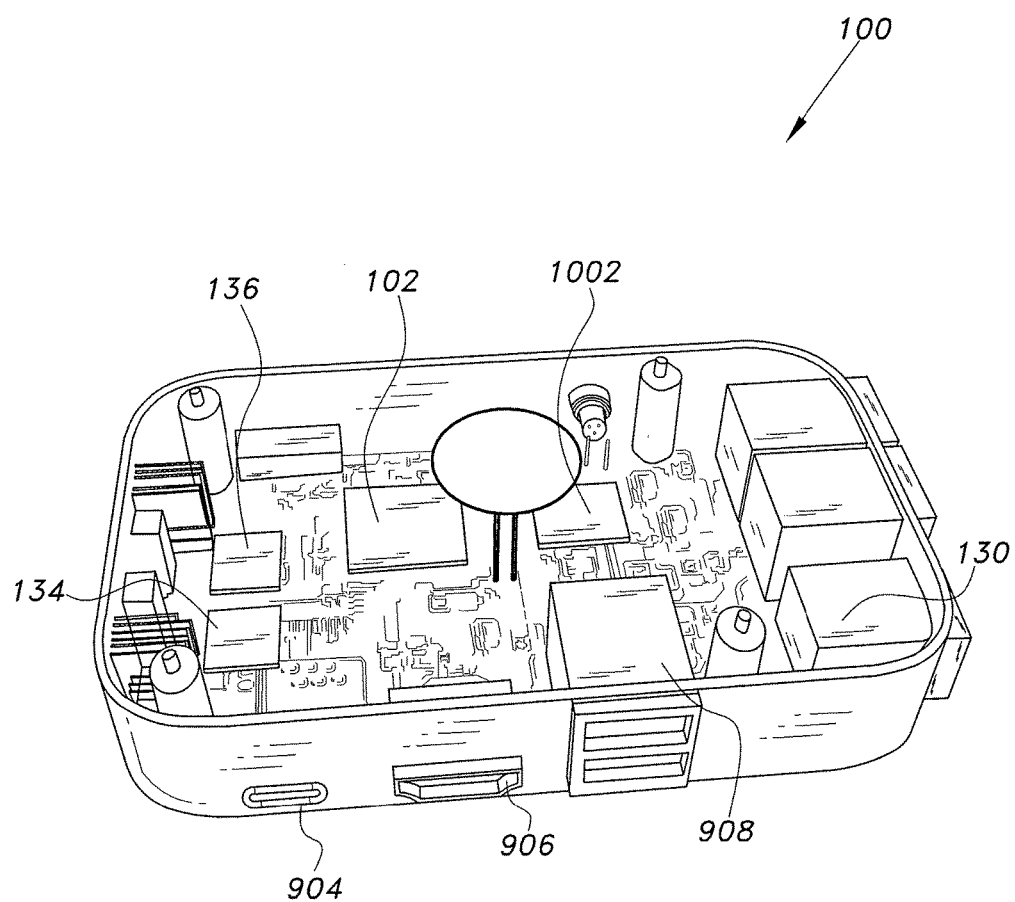
FIG. 10 is a perspective view of a universal astronomical instrumentation control system according to the present invention, shown with part of the housing removed to expose the circuit board and components.

As shown in FIGS. 8, 9, and 10, the SBC ports and switches include at least one USB 2.0 port 802 and at least one USB 3.0 port 908, and a single USB-C OTG 904, which can be used to power the unit or to present the unit as a mass storage device to the host computer, enabling image transfer. FIG. 10 shows the USB 3.0 controller 908 mounted inside the control system housing. The internal mount of a USB 2.0 controller 1002 is also shown in FIG. 10. Additionally, an RJ-45 Ethernet port 880 is included in the unit. A 5-volt, 2.5 ampere power supply jack is also provided. These ports and jacks are disposed along sides of the housing of the universal astronomical instrumentation control system 100.

Figure 16:
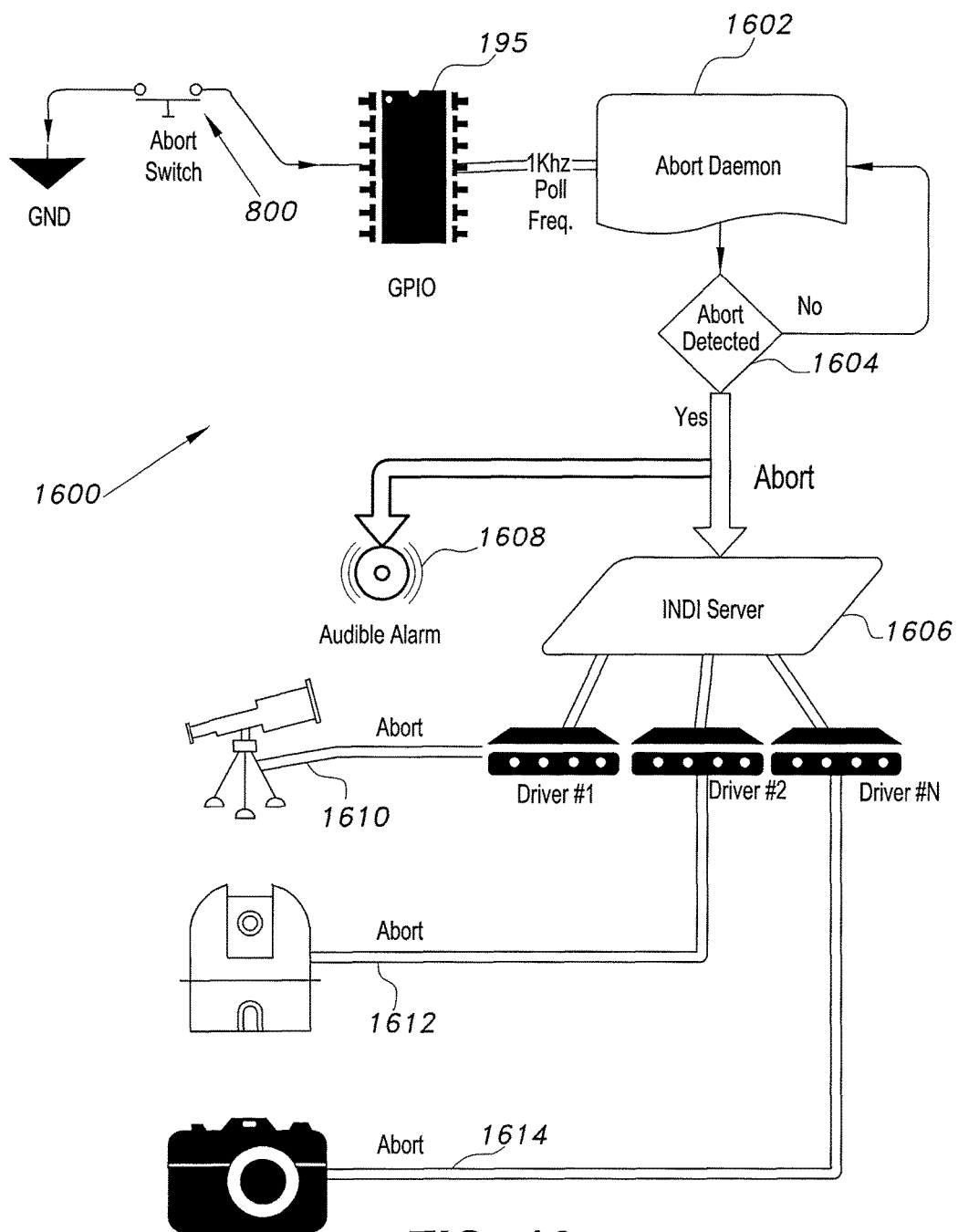
FIG. 16 is a schematic diagram of exemplary INDI abort switch processing services available in a universal astronomical instrumentation control system according to the present invention.
Figure 17:
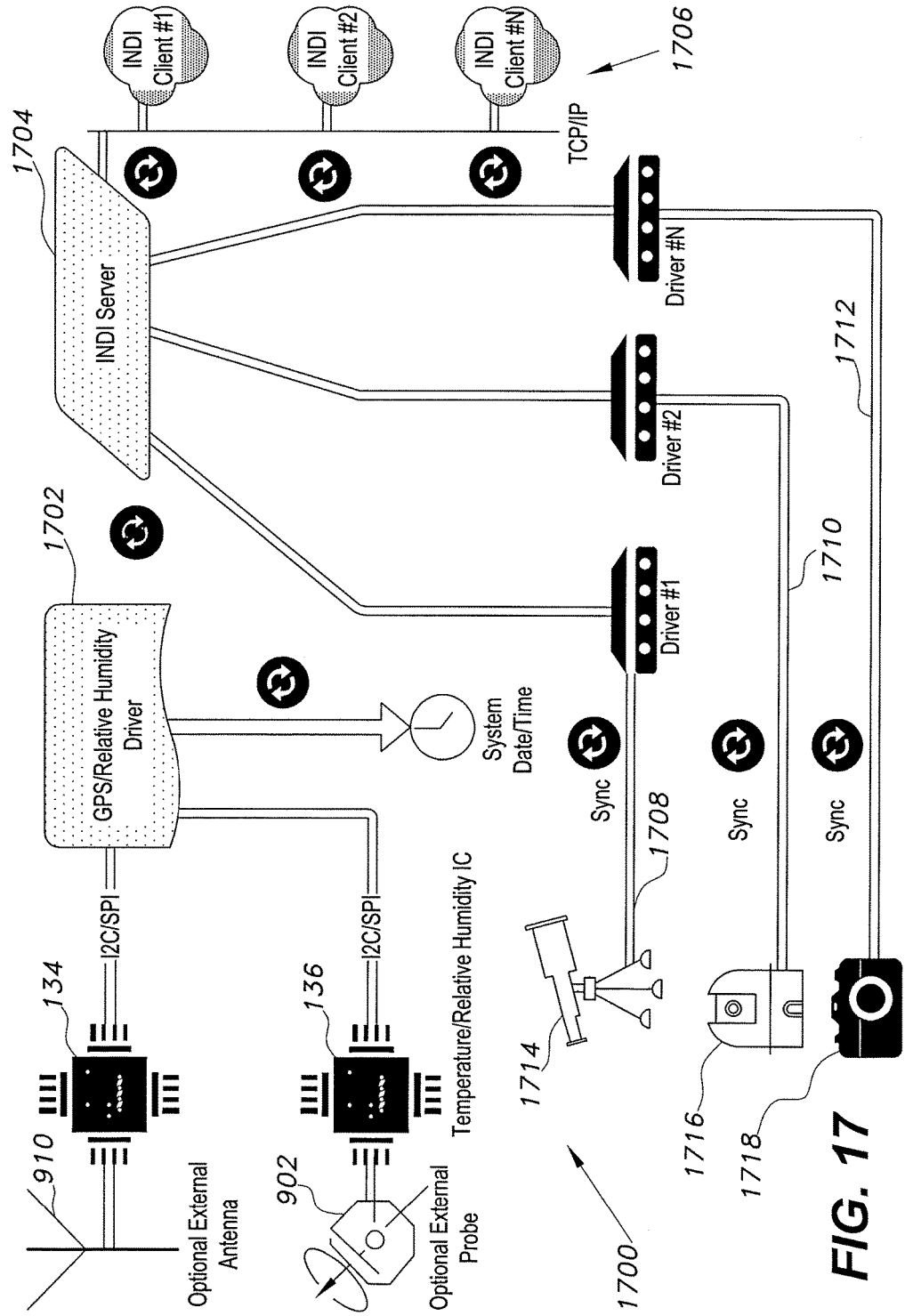
FIG. 17 is a schematic diagram of INDI GPS/temperature/relative humidity synchronization in a universal astronomical instrumentation control system according to the present invention.

An Abort INDI Switch 800, which sends an abort signal to all connected INDI drivers if abort is supported, is disposed atop the housing. A reset switch 804 disposed on the unit restarts the unit when toggled. LED display 806 is disposed on the unit adjacent to the reset switch 804. If pressed for a user-configurable duration, the running INDI server is terminated and restarted. If no INDI server is running, the default profile is started. When pressed in quick successive fashion for N times (user-configurable), the unit is restarted in safe mode where the OS restarts from a known safe snapshot. Background software executes on CPU 104 to provide the aforementioned responses to pressing the abort switch 800 and toggling the reset switch 804. The abort switch processing 1600 (shown in FIG. 16) is implemented using an abort daemon 1602 that polls a GPIO 195 connected to the abort switch 800. If the abort is detected at step 1604, then an audible alarm is triggered at step 1608 and the INDI server abort command is pushed to the drivers at step 1606, the drivers sending abort signals 1610, 1612, and 1614 to respective connected hardware. A micro SD port 22 is disposed adjacent to the LED display 806. An external temperature sensor connector 902 is mounted on a side of the unit 100. The external GPS antenna connector 910 is mounted on the same side near the external temperature sensor connector 902. Software for temperature and GPS synchronization with the INDI drivers executes on the CPU 104. The INDI GPS/temperature/relative humidity synchronization processing 1700 (shown in FIG. 17) utilizes a GPS relative humidity driver 1702 that accepts I2C/SPI signals sent from GPS integrated circuit 134, which is connected to the optional external antenna 910. An optional external probe 902 is similarly connected to temperature/relative humidity integrated circuit 136, which has an I2C/SPI connection to the GPS relative humidity driver 1702, which has a connection to adjust system/date/time, as well as a connection to the INDI server 1704, which passes through the GPS and temperature/relative humidity information synchronized to the system date/time to the INDI server 1704. The INDI Server 1704 passes this synchronized data to the drivers and via connections 1708, 1710, and 1712 to their respectively connected astrometric gear, e.g., telescope 1714, dome 1716, and camera 1718. Moreover, the time synchronized GPS/temperature/relative humidity data is sent from the INDI server 1704 to a variety of INDI clients 1706 via TCP/IP.

The unit 100 includes wired and wireless connectivity, in addition to drivers for the most common astronomical equipment classes used today, including, but not limited to, mounts, CCDs & CMOS cameras, including DSLR cameras, spectrographs, focusers, filter wheels, domes, weather stations, adaptive optics, joysticks, auxiliary devices, and the like.

Figure 11:
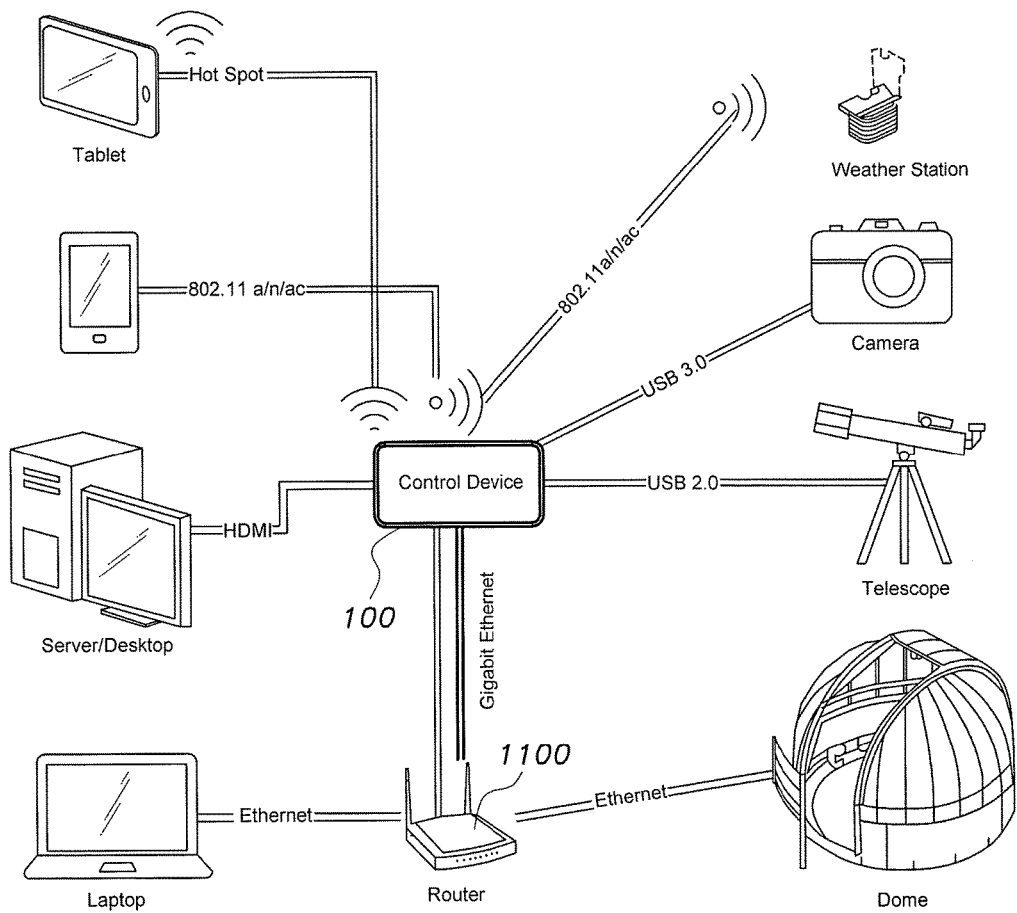
FIG. 11 is a block diagram showing connectivity of a universal astronomical instrumentation control system according to the present invention to a variety of astronomical instrumentation.

As shown in FIG. 11, using only the unit 100 and a mobile phone and/or tablet, the user can control the above astronomical equipment classes without the need of a dedicated desktop and/or laptop computers. An external router 1100 may be connected to the universal astronomical instrumentation control system 100 to provide Ethernet connectivity to a laptop and Ethernet connectivity to a dome. Due to INDI Library's open source policy, any developer can add support to any astronomical or auxiliary device to the public repository. Additionally, the drivers' repository is under continuous improvement and bug-fixing, with daily package builds available for all currently supported architectures (x86 32 bit, x86 64 bit, armhf, aarch64). A current list of supported hardware devices can be found in the INDI Website Devices Directory.

The unit provides network connectivity modes, including wireless hotspot (default), wired (Ethernet), and wireless router (Wi-Fi 802.11 ac/n). Upon the boot-up process, the INDI Network & Web Managers services are started on the device. It enables the user to configure the desired network interface from any browser. By default, the device creates a WPA-protected hotspot network, which the user can connect to using any wireless capable device. The user can then proceed to start the desired drivers for the astronomy equipment either via the built-in INDI Web Manager or Ekos. The unit location and time is synchronized with the onboard GPS receiver. When the user starts the INDI server with the desired drivers, the server and drivers are established on the unit on the default port of 7624, unless otherwise changed by the user.

The unit listens to incoming connections by any INDI compatible client. Once a client establishes connection with the server, it sends a getProperties command to obtain the list of devices and their derived properties. The server sends the devices' properties over TCP/IP using the INDI Wire Protocol in XML format.

When the client receives the device properties, a dynamically generated GUI that encapsulates each device's functionality is constructed. The graphical procedural generation of the dynamic properties differs from client-to-client. On small factor devices, such as mobiles/tablets, the GUI is created in accord with the Human Interface Guidelines (HIG) applicable to the target device, while on desktop/laptop computers, the generation depends on the underlying GUI toolkit and design philosophy of the client application.

Ekos creates an INDI Control Panel for direct manipulation of the driver properties. On the other hand, Ekos modules (Mount, Capture, Focus, Guide, Alignment, and Scheduler) provide context-driven access to manipulate the device properties. For example, the Ekos Mount module provides a graphical interface to move the mount in several predefined canonical directions.

Figure 15:
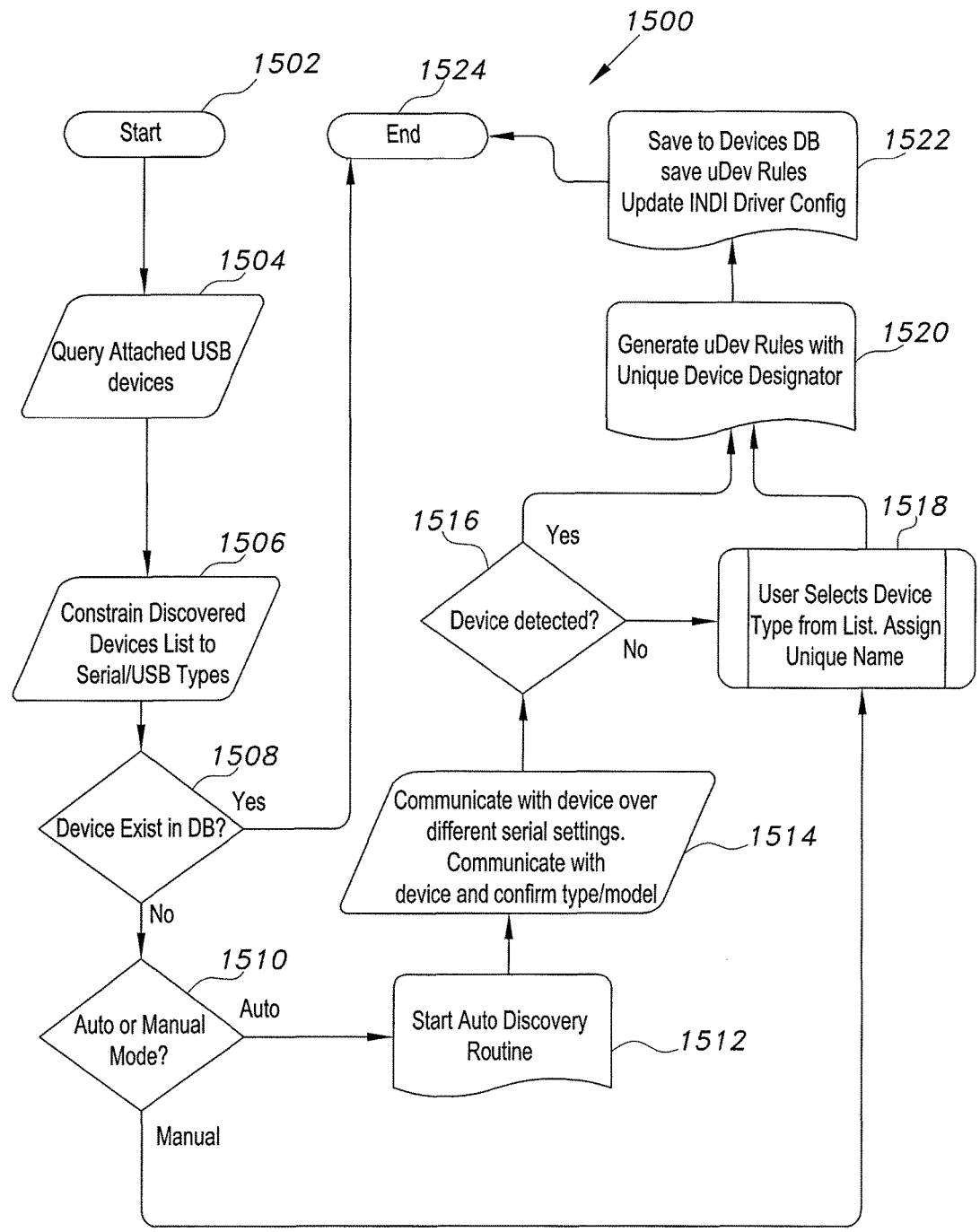
FIG. 15 is a flowchart of an INDI serial port mapper service in a universal astronomical instrumentation control system according to the present invention.

When INDI devices are first created, they provide basic properties including CONNECTION, CONFIGURATION, and DRIVER_INFO standard properties. If connection to the device is performed via an IO port that needs to be configured (Serial Port, USB, TCP/IP, etc.), the user may need to change the port settings before initiating connection with the end device. This is often a onetime operation, unless the particular hardware device port settings change due to external factors. Since most astronomical equipment utilizes serial-to-USB adapters, the operating system assigns the adapter a device node using the GNU/Linux udev service. To ensure consistent serial device port assignments when the device is rebooted, the INDI Serial Port Mapper web service 1500 (shown in FIG. 15) enables the user to assign persistent names to each physical device port based on a number of criteria, including vendor and product IDs, in addition to unique serial adapter identifiers, such as the serial number. After a successful connection is established, each INDI driver sends its device properties via XML to the INDI client(s). Many clients can connect simultaneously to the unit 100. The complete supported clients list is available in the INDI Library site. Exemplary processing of the INDI serial port mapper service 1500 includes process initiation at step 1502, followed by a query of attached USB devices at step 1504. At step 1506, the devices list is constrained to serial/USB types. Step 1508 checks whether the device exists in the database. If yes, processing terminates at step 1524. If no, then step 1510 checks whether the device discovery mode is auto or manual. If the device discovery mode is auto, then the auto discovery routine is initiated at step 1512. Step 1514 then attempts communication with the device over different serial settings, and then attempts communication with the device to confirm device type/model. Step 1516 determines whether the devices were successfully detected. If the device was successfully detected, then uDev rules are generated with a unique device designator at step 1520. Subsequently, at step 1522, the device is saved to a devices database, the uDev rules are saved, and the INDI driver configuration is updated. For manual mode operation as determined by step 1510, and when a device cannot be auto-detected as determined by step 1516, step 1518 is performed, wherein the user selects device type from the list and assigns a unique name to the device.

While mobile/tablet clients can provide basic control over the supported devices, desktop clients are more specialized to perform a specific task and/or workflow. Simple clients may include loggers, watch dogs, and scripting tools, while complex clients can offer such services as guiding and/or image acquisition up to complete astrophotography and observatory automation solutions, such as Ekos.

Ekos provides: (1) control of telescope, CCD (& DSLRs), filter wheel, focuser, guider, adaptive optics unit, and any INDI compatible auxiliary device from Ekos; (2) built-in native auto-guiding with support for automatic dithering between exposures and support for Adaptive Optics devices, in addition to traditional guiders and ability to utilize existing dark frames in the dark files library, with support for external guiding via PHD2; (3) extremely accurate GOTOs using astrometry.net solver (Online, Offline, and Remote solvers are supported); (4) Load & Slew, which loads a Flexible Image Transport System (FITS) image, solves it using the astrometry solver, and then slews to the solved coordinates, and centers the mount on the exact image coordinates in order to get the same desired frame; (5) measure & correct polar alignment errors using astrometry.net solver; and (6) completely automated scheduler to control all the observatory equipment. It selects the best targets for imaging given user configurable conditions and constraints, monitors weather conditions to ensure safe operation of the observatory, and performs data acquisition autonomously. Ekos also provides: (7) the ability to define multiple driver profiles for local and remote setups; (8) auto and manual focus modes using Half Flux Radius (HFR) method; (9) automated unattended meridian flip (Ekos performs post meridian flip alignment, calibration, and guiding to resume the capture session); (10) automatic focus between exposures when a user-configurable HFR limit is exceeded; (11) a powerful sequence queue for batch capture of images with optional prefixes, timestamps, filter wheel selection, and the like; (12) export and import sequence queue sets, such as Ekos Sequence Queue (.esq) files; (13) center the telescope anywhere in a captured FITS image or any FITS with World Coordinate System (WCS) header; (14) automatic flat field capture; (15) automatic abort and resumption of exposure tasks if guiding errors exceed a user-configurable value; (16) support for dome slaving; (17) complete integration with KStars Observation Planner and SkyMap; and (18) fully scriptable via Desktop Bus (DBus); (19) integration with all INDI native devices.

KStars is free, open source, cross-platform astronomy software. It provides an accurate graphical simulation of the night sky, from any location on Earth, at any date and time. The display includes up to 100 million stars, 13,000 deep-sky objects, all 8 planets, the Sun and Moon, and thousands of comets, asteroids, supernovae, and satellites. For students and teachers, it supports adjustable simulation speeds in order to view phenomena that happen over long timescales. The KStars Astrocalculator is used to predict conjunctions and to perform many common astronomical calculations. For the amateur astronomer, KStars provides an observation planner, a sky calendar tool, and an FOV editor to calculate field of view of equipment and display them. The user can find out interesting objects in the "What's up Tonight" tool, plot altitude vs. time graphs for any object, print high-quality sky charts, and gain access to lots of information and resources to help explore the universe.

Included with KStars is Ekos astrophotography suite, a complete astrophotography solution that can control all INDI devices, including numerous telescopes, CCDs, DSLRs, focusers, filters, and a lot more. Ekos supports highly accurate tracking using an online and offline astrometry solver, autofocus, and autoguiding capabilities, and capture of single or multiple images using the powerful built-in sequence manager. KStars can be installed on a number of platforms, most notably Microsoft Windows, Mac OS, and GNU/Linux. KStars is written in C++ using Qt and KDE libraries. The unit performs automatic background OS and security updates when an Internet connection is available, including updating KStars/Ekos and INDI drivers to the latest stable releases.

The Instrument Neutral Distributed Interface (INDI) wire protocol is authored by Elwood Downey of Clear Sky Institute. INDI is a simple XML-like communications protocol described for interactive and automated remote control of diverse instrumentation. INDI is small, easy to parse, and stateless. In the INDI paradigm each Device poses all command and status functions in terms of settings and getting Properties. Each Property is a vector of one or more names members. Each property has a current value vector and a target value vector; provides information about how it should be sequenced with respect to other Properties to accomplish one coordinated unit of observation; and provides hints as to how it might be displayed for interactive manipulation in a GUI.

Figure 12:
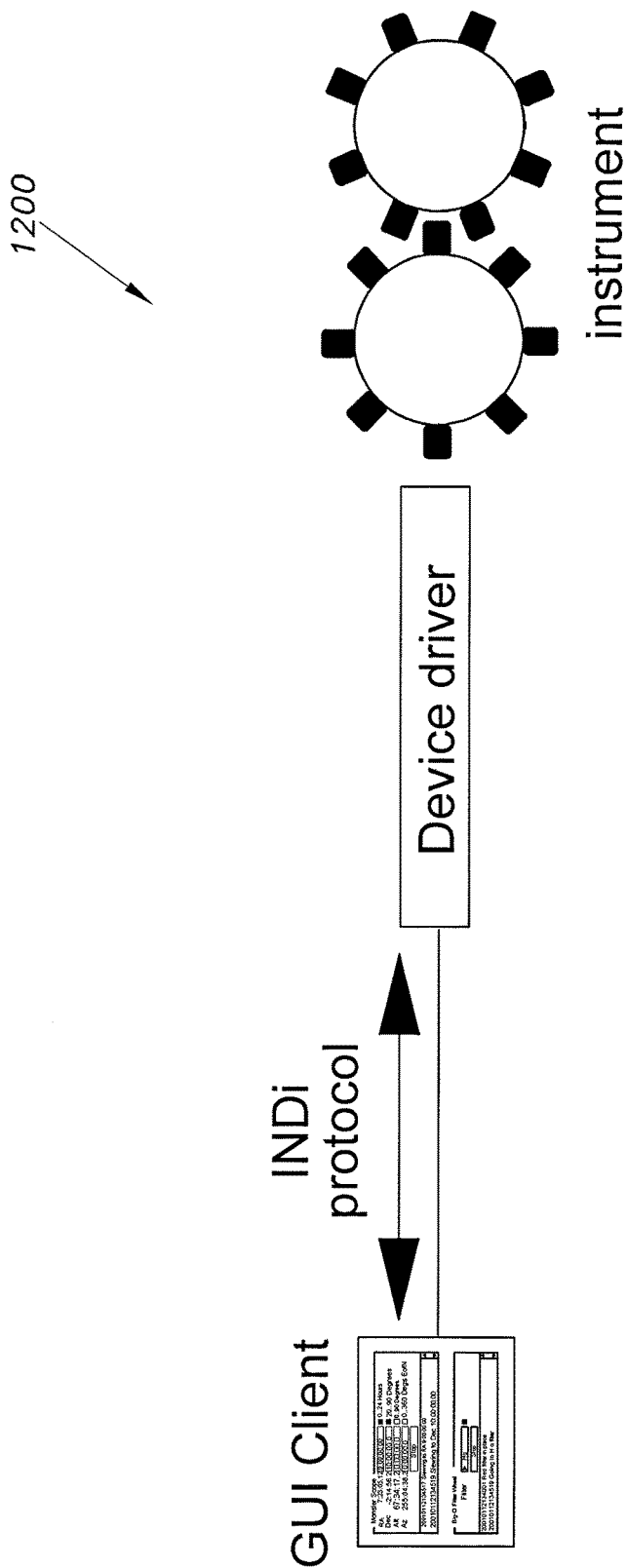
FIG. 12 is a block diagram of a simple INDI configuration in a universal astronomical instrumentation control system according to the present invention.
Figure 13:
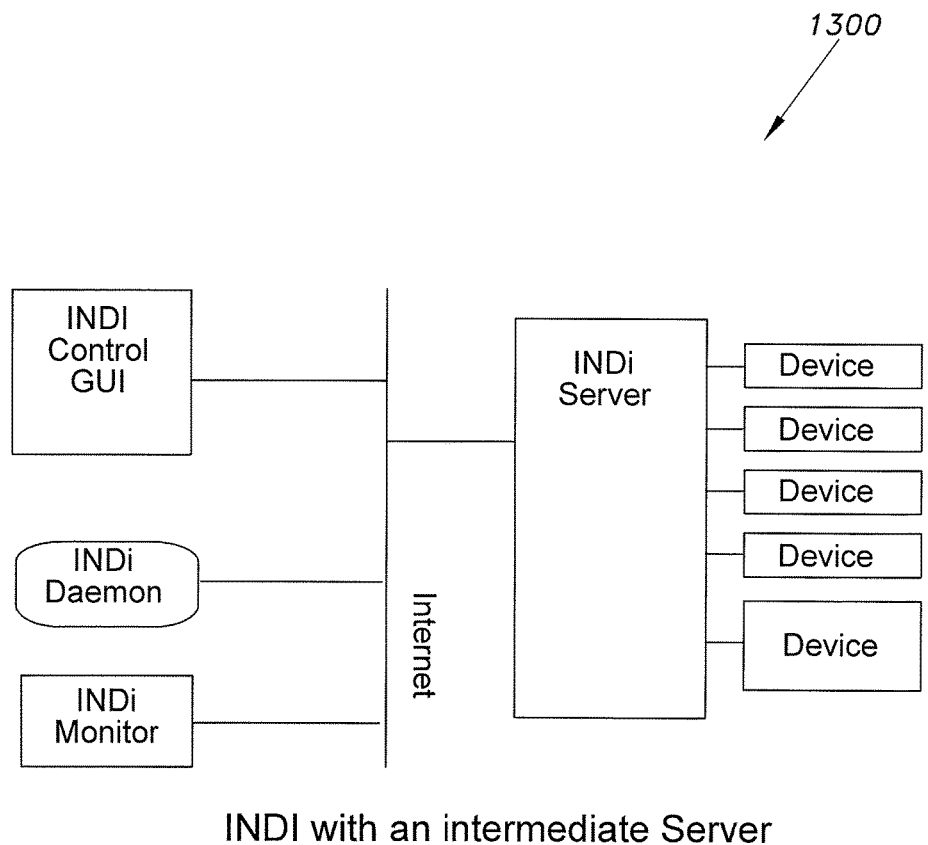
FIG. 13 is a block diagram of an exemplary INDI/intermediate server implementation implemented over a network in a universal astronomical instrumentation control system according to the present invention.

Clients learn the Properties of a particular Device at runtime using introspection. This decouples Client and Device implementation histories. Devices have complete authority over whether to accept commands from Clients. INDI accommodates intermediate servers, broadcasting, and connection topologies ranging from one-to-one on a single system, to many-to-many between systems of different genres. The INDI protocol can be nested within other XML elements, such as constraints for automatic scheduling and execution. INDI is intended for developers who seek a scalable API for device control and automation. INDI Library is a POSIX implementation of the INDI wire protocol and it is the version used within the unit. Hardware drivers written under INDI can be used under any INDI-compatible client. INDI serves as a backend only. Frontend clients are needed to control devices. Current clients include KStars, Xephem, Cartes du Ciel, and many more. A simple INDI configuration 1200 is illustrated in FIG. 12. An exemplary INDI/intermediate server implementation 1300 is illustrated in FIG. 13.

Bundled with the software stack are the open source astrometry.net solver and index files covering sky marker resolutions from 2 arcminutes to 33.3 degrees. Ekos can trigger image acquisition, which can be submitted to the offline astrometry solver to solve and pinpoint the location of the telescope with high accuracy. Astrometry results can be fed to INDI's Alignment Subsystem to improve the mount's pointing accuracy.

Ekos is a complete astrophotography solution that can control all INDI devices, including numerous telescopes, CCDs, DSLRs, focusers, filters, and a lot more. Ekos supports highly accurate tracking using online and offline astrometry solver, autofocus and autoguiding capabilities, and capture of single or multiple images using the powerful built in sequence manager. It is an advanced cross-platform observatory control and automation tool with particular focus on Astrophotography. It is based on a modular extensible framework to perform common astrophotography tasks. This includes highly accurate GOTOs using astrometry solver, ability to measure and correct polar alignment errors, auto-focus and auto-guide capabilities, and capture of single or stack of images with filter wheel support. Ekos is shipped with KStars. The latest Ekos release corresponds with the KStars release discussed above.

The complete software stack can be updated via the Internet by using the cross-platform INDI Update Manager. The environmentally protected enclosure provides several MENA IP ratings based upon user requirements.

The unit 100 provides control switches, such as a multipurpose Reset switch, which restarts the unit or restarts it in safe-mode based on a prior snapshot, and an Abort Switch, which Sends the abort operation to any connected INDI devices that support the abort functionality. When the reset switch is pressed for a user-configurable duration, the INDI server and drivers are terminated and restarted.

Figure 14:
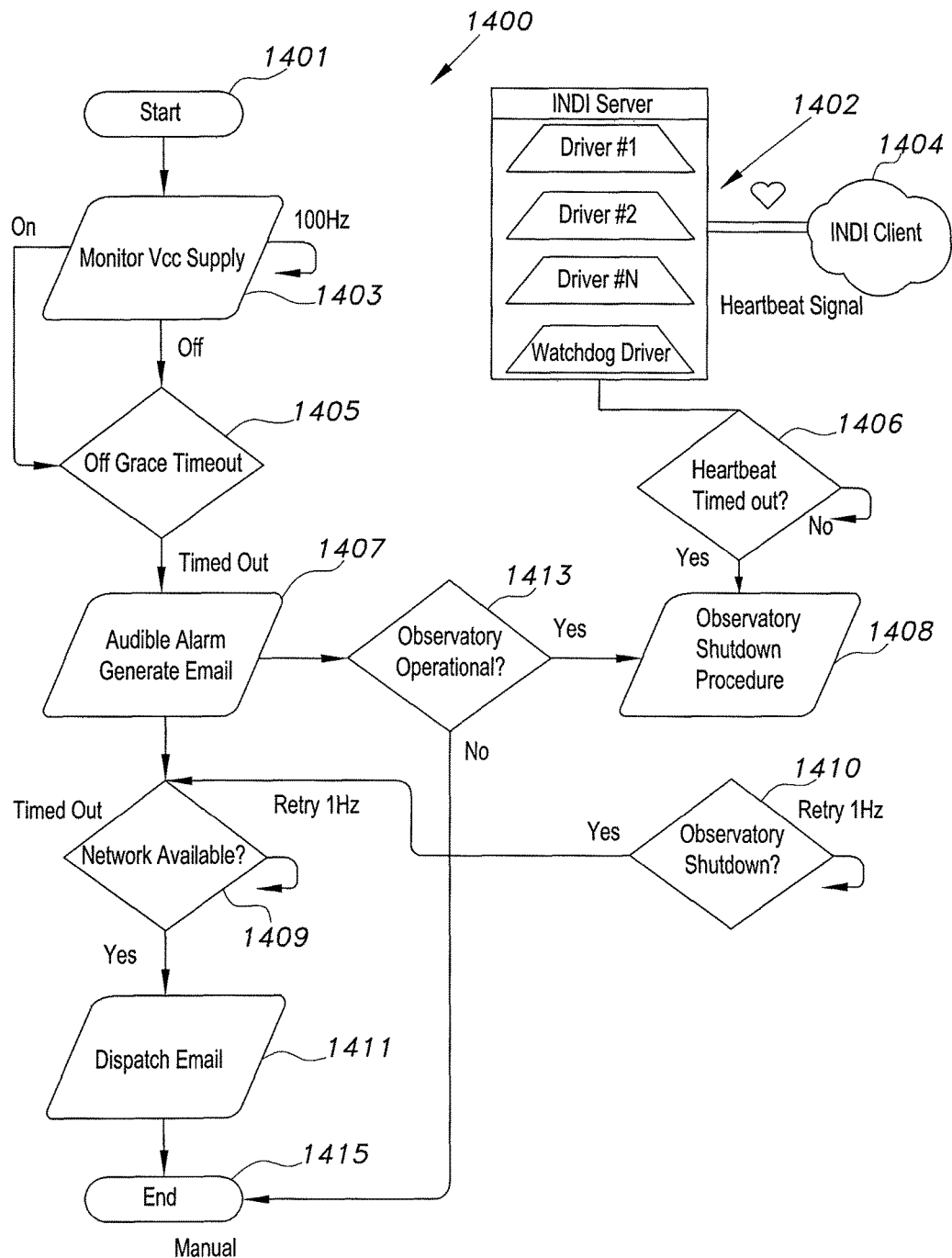
FIG. 14 is a flowchart of an INDI watchdog service in a universal astronomical instrumentation control system according to the present invention.

To ensure secure remote operation of the observatory, INDI WatchDog driver 1400 (shown in FIG. 14) can be configured to initiate a shutdown procedure in case connection is lost with the client for a user-configurable timeout duration. The processing of an exemplary WatchDog driver 1400 starts at step 1401, and at step 1403, monitors the $V_{cc}$ power source at a 100 Hz rate. If the $V_{cc}$ monitoring step 1403 detects that the power source is off, a grace period timeout is initiated at step 1405. Once the power source has been off past the off grace timeout period, an audible alarm and e-mail notification are generated at step 1407. A check is made at step 1413 to see if the observatory is operational. If it is not, processing terminates at step 1415. If the observatory is operational, an observatory shutdown procedure is initiated at step 1408. If the network is available as checked for at a 1 Hz rate according to step 1409, the e-mail is dispatched at step 1411, and processing ends at step 1415. On the server side, the INDI server/drivers 1402 exchange heartbeat signals with the INDI client 1404. At step 1406, a check is made to determine whether the heartbeat has timed out. If the heartbeat has timed out, the observatory shutdown procedure at step 1408 is initiated. An observatory shutdown check at step 1410 is performed at a 1 Hz rate, upon which the aforementioned steps 1409, 1411, and 1415 are performed.

INDI CCD drivers provide data upload modes, such as a Client mode in which Captured images are uploaded to the client, a Both mode in which Captured images are saved locally and uploaded to the client, and a Local mode in which Captured images are only saved locally. In order to conserve bandwidth, the user may elect to store capture images locally on the unit. To transfer captured images to the client after image acquisition is complete, the user can utilize the INDI Image Manager to browse, transfer, and delete images from the unit.

Operation of the unit 100 ranges from simple direct control of a telescope via a mobile phone application to complete observatory-level remote autonomous data acquisition and control via Ekos. Due to the wide range of operational uses, a typical data acquisition and control scenario is described. For example, the user may select one or more desired targets in Ekos Scheduler and fill in required startup and completion conditions, in addition to any constraints that must be met during the course of the observation. Next, the user selects Ekos Sequence Queue (.esq) file that contains the capture procedure required to gather the data. The user may select observatory-level startup and shutdown scripts in case the observatory requires special startup and shutdown procedures in addition to the default procedures, which include Warm up CCD, Dust Cap Parking/Unparking, Mount Parking/Unparking, and Dome Parking/Unparking. Next, the user starts the scheduler. The scheduler calculates a score for each target and selects the best candidate for data acquisition. If no target is available, the scheduler sleeps until the target becomes available. Based on user-configurable scheduler steps, the scheduler proceeds to perform the Track procedure, which slews and tracks the mount to the desired target, and the Focus procedure, which performs auto-focusing using the user-selected HFR algorithm in the focus module. Stars are automatically selected and optionally subframed to increase performance. The Alignment procedure, which performs astrometric alignment using astrometry.net either via direct capture or via solving an existing FITS image of the desired target frame is performed; then the Guide procedure, which selects the Best candidate guide star and initiates an automatic calibration procedure, followed by autoguiding; then the Capture procedure, which loads the user Ekos Sequence Queue file and starts the data acquisition phase. After each exposure is complete, the following procedures may be executed, depending on user selections. (1) The In-Sequence-Focusing procedure may be performed, in which a subframe is captured and HFR is calculated to measure against target HFR threshold. If the HFR value is within the threshold, the operation completes successfully; otherwise, an autofocus operation is initiated to adjust focus until an optimal solution is found. (2) The Dithering procedure may be performed, in which the guide frame is dithered in random directions governed by the magnitude of the dithering pixel value. (3) The Custom Script procedure may be formed, in which an optional custom script can be executed for any operations desired by the user.

When a job completes data acquisition, the scheduler searched for the next best candidate and the cycle starts over. If the next target data acquisition startup time is within the park-wait threshold timeout, the observatory performs parking and sleeps until startup time is imminent. If all jobs are completed, the shutdown procedure is initiated.

It is to be understood that the present invention is not limited to the embodiments described above, but encompasses any and all embodiments within the scope of the following claims.

I claim:

1. A universal astronomical instrumentation control system for automating observatory equipment and driving a plurality of astronomy and astrophotography devices, comprising:
   a protective housing;
   a single board computer (SBC) having an operating system and including GPS, Temperature, and Humidity sensors, and auxiliary ports disposed in the protective housing, wherein the SBC further comprises:
   i) an Ethernet port adapted for connection to the observatory equipment and the astrophotography devices;
   ii) a wireless network controller adapted for connection to the observatory equipment and the astrophotography devices;
   iii) a LAN controller, whereby tablets and remote computers may connect to observatory equipment by connection through the SBC;
   iv) a wireless hotspot, whereby tablets and remote computers may connect to observatory equipment by connection through the SBC;
   v) an abort switch for immediate and secure shutdown of the observatory equipment and the astrophotography devices; and
   vi) a reset switch for restarting the operating system or for restarting the control system in safe-mode;
   Instrument Neutral Distributed Interface (INDI) compatible server-side software embedded on the SBC, wherein the control system is in communication with the plurality of astronomy and astrophotography devices; and
   astrophotography software embedded on the SBC, wherein the control system is in communication with the observatory equipment and astrophotography devices.

* * * * *